March 9, 1948.    G. F. TAYLOR    2,437,625
PROCESS AND DIE FOR EXTRUDING TUBULAR PLASTIC PRODUCTS
Filed Oct. 30, 1942
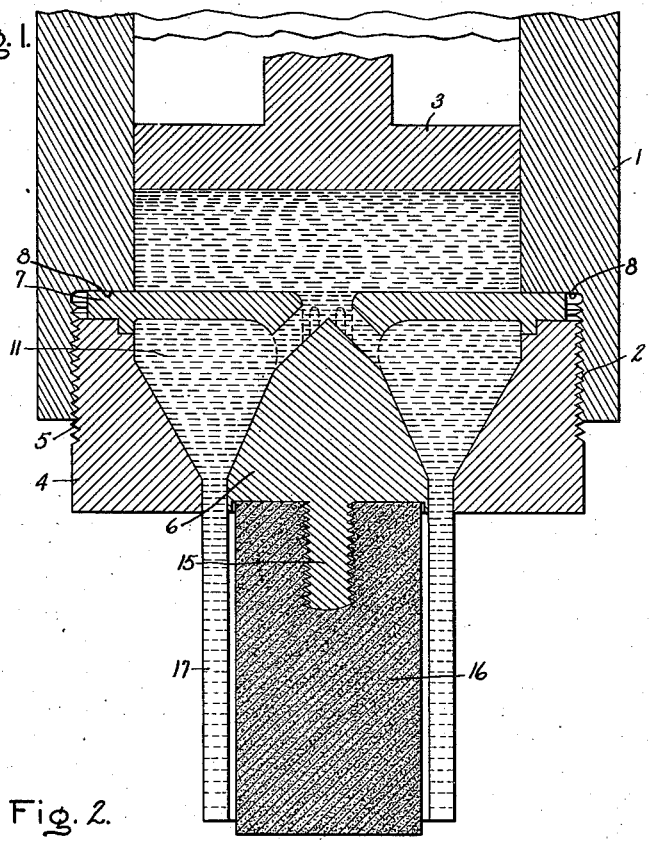
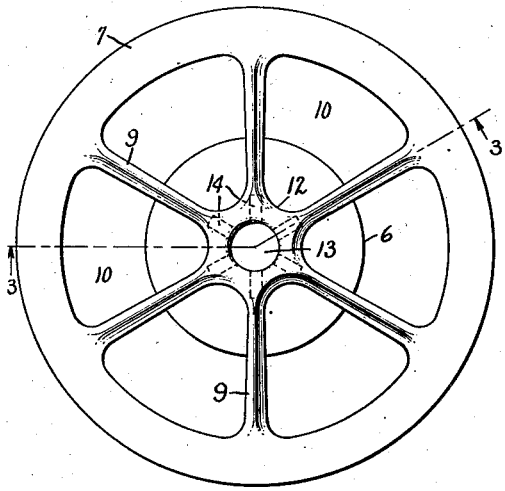
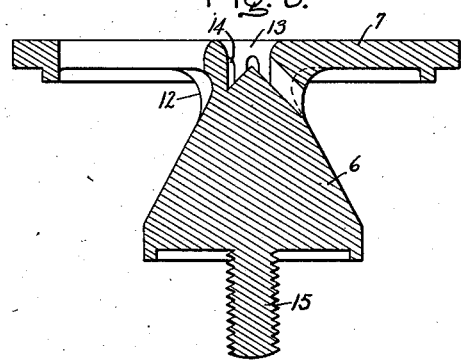
Inventor:
George F. Taylor,
by Harry E. Dunham
His Attorney.

Patented Mar. 9, 1948

2,437,625

UNITED STATES PATENT OFFICE 2,437,625

PROCESS AND DIE FOR EXTRUDING TUBULAR PLASTIC PRODUCTS

George F. Taylor, Grosse Point Woods, Mich., assignor to Carboloy Company, Inc., Detroit, Mich., a corporation of New York Application October 30, 1942, Serial No. 463,885

8 Claims. (Cl. 75—22)

The present invention relates to means for extruding plastic material and more particularly to a mechanism adapted for the extrusion of hard metal compositions in tubular form.

My prior Patent No. 2,271,960, February 3, 1942, discloses a process for extruding plastic material and particularly a mixture of cemented carbide ingredients and a plasticising medium. The patent also discloses means for extruding tubular structures having a relatively small diameter, for example about one-quarter inch outside diameter or less and relatively thick walls. It is one of the objects of the present invention to provide an extrusion mechanism which is not limited either with respect to the diameter of the extruded tubular product or the thickness of the walls thereof. It is a further object of the invention to provide a die suitable for quantity extrusion of shaped tubular members whether of circular, hexagonal, elliptical or other desired cross section. Other objects will appear hereinafter.

The novel features which are characteristic of my invention are set forth with particularity in the appended claims. My invention itself, however, will best be understood from reference to the following specification when considered in connection with the accompanying drawing in which Fig. 1 is a vertical cross sectional view of an extrusion apparatus incorporating the features of the present invention; Fig. 2 is a plan view of the inner or mandrel member of the extrusion die, while Fig. 3 is a cross sectional view of the mandrel member of the die taken on the line 3—3 of Fig. 2.

Referring more particularly to the drawing, I have indicated at 1 a steel casing adapted to contain plastic material to be extruded and provided with a screw threaded portion 2 at its lower end. A plunger 3 mounted in the casing is adapted to apply pressure to the plastic material. The extrusion die comprises an outer contour-forming member 4 provided with external screw threads 5 adapted to engage the screw threads 2 on the casing 1. The inner or mandrel portion of the extrusion die comprises a depending, conical-shaped member 6 supported by a wheel-like member 7, the latter being mounted in position between a shoulder 8 on the casing 1 and the outer die member 4. The wheel-like member has radial spokes 9 providing a series of axial openings 10 through which the plastic material may be forced into the mixing chamber 11 of the extrusion die. The hub portion 12 of the wheel-like member is provided with a central opening 13 and a series of circumferentially arranged openings 14 extending therethrough whereby thorough mixing of the plastic material is attained. The lower end of the mandrel member 6 is provided with a screw threaded extension 15 to which a cylindrical support 16 of refractory material such as graphite may be detachably secured.

In operation, the extrusion die is first secured to the lower end of the casing 1 as indicated in Fig. 1 of the drawing. The plastic material to be extruded, which may be a hard metal composition prepared as set forth in my prior Patent No. 2,271,960 is placed in the casing 1. The application of pressure to the plastic material in the casing causes it to flow through openings 10 and 14 in the wheel like member and into the mixing chamber 11. Further pressure forces the mixed plastic material between the inner and outer members of the extrusion die and around the graphite supporting member 16. When a desired length of tube has been extruded it is cut off at the base of the die. The refractory member 16 with the extruded tube 17 thereon is then detached from the mandrel die member 6. While supported by the member 16 the tube 17 is dried and thereafter sintered into a hard, dense mass. The diameter of the refractory member 16 is somewhat smaller than the inside diameter of the extruded tubular member 17 thereby permitting shrinkage of the tube 17 during drying and subsequent sintering.

Although I have illustrated on the drawing a refractory cylinder 16 which is a solid carbon rod, it may, if desired, be in the form of a hollow carbon tube or a hollow carbon spiral attached to the mandrel member 6 of the die in any convenient manner. In general, a thin walled carbon tube support is preferred because of its light weight and the greater ease with which it may be removed from the sintered tube. In extruding material such as cemented carbides, a sintering temperature in the neighborhood of about 1400° C. is employed. The extruded material is quite plastic at that temperature and will stretch somewhat after it seizes the graphite support. The coefficient of expansion of the graphite support or mandrel 16 is slightly greater than that of the extruded cemented carbide and therefore as the graphite cools it contracts at a faster rate than the metal tube and there is no danger of cracking the metal tube. Generally, it will be found desirable to coat the surface of the graphite supporting member 16 with a refractory powder such as alundum or the like to prevent the extruded paste tube from sticking to the support 16.

Tubular members formed in accordance with my improved process are straight and true and have a uniform wall thickness. As the extruded metal tube shrinks upon the graphite support it of course takes the form and size of the support. The latter, for example, may have a circular, elliptical, hexagonal, or other desired cross section. After sintering, the carbon support 17 may be pushed out or bored out of the sintered tube which is then ready for use.

What I claim as new and desire to secure by Letters Patent of the United States, is:

1. A die for extruding plastic material, said die comprising a mixing chamber formed by an outer die member and a cooperating inner or mandrel member, said mandrel member being secured to a wheel like member, said wheel like member being supported on said outer die member, the hub portion of said wheel like member having a plurality of circumferentially arranged openings extending therethrough and communicating with said mixing chamber, said mandrel member having means for supporting the extruded material.

2. A die for exruding plastic material, said die comprising a mixing chamber formed by an outer die member and a cooperating inner or mandrel member, said mandrel member being secured to a wheel like member, said wheel like member being supported on said outer die member, the hub portion of said wheel like member having a plurality of openings therethrough communicating with said mixing chamber, and a refractory member detachably secured to said mandrel member and adapted to support the extruded material.

3. A die for extruding tubular hard metal composition, said die comprising a mandrel member supported by a wheel like member which has a series of spokes, the space between adjacent spokes providing coaxial openings into the die, a hub portion on said wheel-like member having a central opening and a series of circumferentially arranged openings extending diagonally downward from said central opening and through said hub portion.

4. A process for extruding tubular, plastic metallic material which comprises pressing the plastic material into a mixing chamber and extruding the plastic, metallic material from the mixing chamber in the form of a tube around but substantially out of contact with a refractory cylinder on which the extruded material is subsequently sintered, the perimeter of said cylinder being appreciably less than the inner perimeter of the extruded material, and thereafter drying and sintering said tube while positioned around said refractory cylinder to thereby cause said tube to become hard and dense and assume the shape of said refractory cylinder.

5. The method for making sintered cemented carbide tubes which comprises placing a plastic mixture of cemented carbide ingredients in the form of a tube onto a refractory support so that the plastic material fits loosely thereon and thereafter drwing and sintering said plastic material on said refractory support to thereby form a hard, dense, thin-walled tube having the shape of said support.

6. The method for making sintered, cemented carbide tubes which comprises telescoping a plastic mixture of cemented carbide ingredients in the form of a tube around a refractory support having an appreciable smaller diameter than the inside diameter of said tube and thereafter drying and sintering said tube while positioned on said support to thereby cause said tube to become hard and dense and assume the shape of said refractory support.

7. The method for making sintered, thin-walled cemented carbide tubes which comprises extruding a plastic mixture of cemented carbide ingredients in the form of a tube and around but out of contact with a refractory support, depositing the extruded tube onto said support and thereafter drying and sintering said supported tube to form a hard, dense, thin-walled tube having the shape of said refractory support.

8. The method for making thin-walled cemented carbide tubes which comprises extruding a plastic mixture of cemented carbide ingredients in the form of a tube and around but out of contact with a refractory support, depositing the extruded tube onto said support, drying and sintering the supported tube to form a hard, dense mass having the shape of said refractory support.

GEORGE F. TAYLOR.

REFERENCES CITED

The following references are of record in the file of this patent:

UNITED STATES PATENTS

| Number | Name | Date |
|---|---|---|
| 236,066 | Murtagh | Dec. 28, 1880 |
| 1,196,648 | Bleecker | Aug. 29, 1916 |
| 1,541,528 | Royle | June 9, 1925 |
| 1,918,212 | Palmer | Aug. 11, 1933 |
| 2,068,848 | DeBats | Jan. 26, 1937 |

OTHER REFERENCES

Wulff, "Powder Metallurgy," page 28, published 1942 by American Society for Metals, Cleveland, Ohio.